US012449083B2

(12) United States Patent
Adelman et al.

(10) Patent No.: US 12,449,083 B2
(45) Date of Patent: Oct. 21, 2025

(54) COLD EXPANSION PIPE FITTING, PIPE CONNECTION, SYSTEM, EQUIPMENT, AND METHOD

(71) Applicant: UPONOR INNOVATION AB, Virsbo (SE)

(72) Inventors: Duane Adelman, Lakeville, MN (US); Adam Platt, Lakeville, MN (US)

(73) Assignee: UPONOR INNOVATION AB, Virsbo (SE)

( * ) Notice: Subject to any disclaimer, the term of this patent is extended or adjusted under 35 U.S.C. 154(b) by 651 days.

(21) Appl. No.: 17/280,311

(22) PCT Filed: Sep. 27, 2019

(86) PCT No.: PCT/EP2019/076219
§ 371 (c)(1),
(2) Date: Mar. 26, 2021

(87) PCT Pub. No.: WO2020/065026
PCT Pub. Date: Apr. 2, 2020

(65) Prior Publication Data
US 2021/0254773 A1     Aug. 19, 2021

(30) Foreign Application Priority Data

| Sep. 27, 2018 | (FI) | 20185806 |
| Oct. 12, 2018 | (EP) | 18200008 |
| Dec. 18, 2018 | (EP) | 18213287 |

(51) Int. Cl.
*F16L 47/22* (2006.01)
*B29C 57/04* (2006.01)
(Continued)

(52) U.S. Cl.
CPC ............... *F16L 47/22* (2013.01); *F16L 33/22* (2013.01); *B29C 57/04* (2013.01); *B29K 2995/0049* (2013.01); *B29L 2023/22* (2013.01)

(58) Field of Classification Search
CPC ....... F16L 33/22; F16L 33/223; F16L 33/224; F16L 47/22; F16L 13/147; F16L 13/166
(Continued)

(56) References Cited

U.S. PATENT DOCUMENTS

| 1,532,886 | A | * | 4/1925 | Cowles | F16L 33/222 |
| | | | | | 285/259 |
| 3,017,203 | A | * | 1/1962 | Macleod | F16L 33/22 |
| | | | | | 285/259 |

(Continued)

FOREIGN PATENT DOCUMENTS

| CN | 106563737 A | 4/2017 |
| DE | 19504968 A1 | 8/1996 |

(Continued)

OTHER PUBLICATIONS

Extended European Search Report of European Patent Application No. 18213287.8, Filing Date Dec. 18, 2018, Date of Mailing Jul. 26, 2019, 11 pages.

(Continued)

*Primary Examiner* — Zachary T Dragicevich
*Assistant Examiner* — Fannie Kee
(74) *Attorney, Agent, or Firm* — CANTOR COLBURN LLP

(57) ABSTRACT

A pipe fitting (100) includes a tubular connecting part (101); the tubular connecting part being configured to be inserted into an expanded pipe end section (111) of a pipe (110) having a first circumferential intact sealing region (113) on the inner surface (112) of the pipe end section (111); the tubular connecting part comprising a first radially outwards (Continued)

extending circumferential sealing barb (105') positioned for engaging, when in use, with the first circumferential intact sealing region during shrinkage of the pipe end section for forming a sealing between the pipe fitting and the pipe.

14 Claims, 4 Drawing Sheets

(51) Int. Cl.
 *B29L 23/00* (2006.01)
 *F16L 33/22* (2006.01)
(58) Field of Classification Search
 USPC .......................................... 285/239, 241–242
 See application file for complete search history.

(56) References Cited

U.S. PATENT DOCUMENTS

| | | | | |
|---|---|---|---|---|
| 3,224,794 | A * | 12/1965 | Crissy | F16L 33/22 |
| | | | | 285/259 |
| 3,425,719 | A * | 2/1969 | Burton | F16L 13/166 |
| | | | | 29/516 |
| 3,815,940 | A * | 6/1974 | Luckenbill | F16L 33/22 |
| | | | | 285/423 |
| 3,888,102 | A | 6/1975 | Nigido | |
| 3,966,238 | A * | 6/1976 | Washkewicz | F16L 33/22 |
| | | | | 285/239 |
| 4,114,930 | A * | 9/1978 | Perkins | F16L 13/147 |
| | | | | 29/520 |
| 4,226,446 | A * | 10/1980 | Burrington | F16L 33/22 |
| | | | | 285/259 |
| 4,657,285 | A * | 4/1987 | Akiyama | F16L 33/22 |
| | | | | 285/239 |
| 4,664,423 | A | 5/1987 | Rowley | |
| 4,753,101 | A | 6/1988 | Shultz | |
| 5,105,854 | A * | 4/1992 | Cole | F16L 33/22 |
| | | | | 138/109 |
| 5,137,309 | A * | 8/1992 | Beagle | F16L 33/22 |
| | | | | 285/259 |
| 5,558,375 | A * | 9/1996 | Newman | F16L 33/224 |
| | | | | 285/23 |
| 5,605,359 | A * | 2/1997 | Hoff | F16L 33/22 |
| | | | | 285/259 |
| 5,853,202 | A * | 12/1998 | Li | F16L 33/22 |
| | | | | 285/239 |
| 6,308,992 | B1 * | 10/2001 | Mitsui | F16L 33/22 |
| | | | | 285/239 |
| 6,561,550 | B1 * | 5/2003 | Kiraz | F16L 33/22 |
| | | | | 285/259 |
| 6,715,800 | B1 * | 4/2004 | Hennig | F16L 33/223 |
| | | | | 285/259 |
| 6,779,269 | B2 * | 8/2004 | Green | F16L 33/228 |
| | | | | 285/239 |
| 6,971,390 | B1 * | 12/2005 | Vasek | F16L 33/223 |
| | | | | 604/533 |
| 7,434,845 | B2 * | 10/2008 | Ogiso | F16L 33/22 |
| | | | | 285/239 |
| 8,220,126 | B1 * | 7/2012 | Yunk | F16L 47/22 |
| | | | | 285/294.1 |
| 9,273,811 | B1 * | 3/2016 | Webber | F16L 33/22 |
| 9,476,529 | B2 * | 10/2016 | Kury | F16L 33/22 |
| 9,975,289 | B2 | 5/2018 | Li et al. | |
| 2004/0155459 | A1 * | 8/2004 | Katayama | F16L 33/22 |
| | | | | 285/239 |
| 2004/0222630 | A1 * | 11/2004 | Katayama | F16L 47/22 |
| | | | | 285/239 |
| 2004/0253340 | A1 | 12/2004 | Tandart | |
| 2006/0152006 | A1 * | 7/2006 | Paquis | F16L 33/22 |
| | | | | 285/239 |
| 2012/0181727 | A1 | 7/2012 | Lindner et al. | |
| 2012/0200082 | A1 * | 8/2012 | Liang | F16L 33/223 |
| | | | | 285/371 |
| 2013/0140739 | A1 | 6/2013 | Lundequist et al. | |
| 2013/0341831 | A1 | 12/2013 | Thorson | |
| 2014/0138944 | A1 * | 5/2014 | Kury | F16L 33/22 |
| | | | | 285/239 |
| 2015/0130184 | A1 * | 5/2015 | Filipczak | F16L 33/22 |
| | | | | 285/252 |
| 2015/0367556 | A1 | 12/2015 | Ellice | |
| 2016/0361864 | A1 | 12/2016 | Dickert et al. | |
| 2018/0065282 | A1 | 3/2018 | Runyan | |
| 2019/0351605 | A1 | 11/2019 | Trickle | |
| 2021/0254773 | A1 | 8/2021 | Adelman | |
| 2022/0040906 | A1 | 2/2022 | Adelman | |

FOREIGN PATENT DOCUMENTS

| | | |
|---|---|---|
| DE | 202008006416 U1 | 10/2009 |
| DE | 102014011122 A1 | 1/2016 |
| EP | 2130664 A1 | 12/2009 |
| KR | 20160057252 A | 5/2016 |
| WO | 2011056065 A1 | 5/2011 |
| WO | 2015191991 A1 | 12/2015 |
| WO | 2016201196 A1 | 12/2016 |

OTHER PUBLICATIONS

International Search Report of International Application No. PCT/EP2019/076219, International Filing Date Sep. 27, 2019, Date of Mailing Dec. 3, 2019, 5 pages.
International Search Report of International Application No. PCT/EP2019/076223, International Filing Date Sep. 27, 2019, Date of Mailing Nov. 26, 2019, 6 pages.
Search Report of Finnish Patent Application No. 20185806, filed Sep. 27, 2018, Date of Mailing Apr. 26, 2019, 2 pages.
Non-Final Office Action issued by the US Patent and Trademark Office, dated Mar. 22, 2023, in U.S. Appl. No. 17/280,255, filed Mar. 26, 2021, 14 pages.
Advisory Action issued by the U.S. Patent and Trademark Office, dated Dec. 16, 2022, in U.S. Appl. No. 17/280,255, filed Mar. 26, 2021, 8 pages.
"Hooke's Law—Wikipedia." Wikipedia, web.archive.org/web/20180808075717/https://en.wikipedia.org/wiki/Hooke's_law. Published Aug. 8, 2018. (Year: 2018).
"Stiffness—Wikipedia." Wikipedia, web.archive.org/web/20180529210848/https://en.wikipedia.org/wiki/Stiffness. Published May 29, 2018. (Year: 2018).
Advisory Action issued Dec. 16, 2022 by the USPTO in related case, U.S. Appl. No. 17/280,255, filed Mar. 26, 2021 and List of references cited, 6 pages.

\* cited by examiner

COLD EXPANSION PIPE FITTING, PIPE CONNECTION, SYSTEM, EQUIPMENT, AND METHOD

CROSS REFERENCE TO RELATED APPLICATIONS

This application is a National Stage application of PCT/EP2019/076219, filed Sep. 27, 2019, which claims the benefit of Finland Application No. 20185806, filed Sep. 27, 2018, European Patent Application No. 18200008.3, filed Oct. 12, 2018, and European Patent Application No. 18213287.8, filed Dec. 18, 2018, all of which are incorporated by reference in their entirety herein.

BACKGROUND

Pipe connections for various plumbing and heating applications may be formed by utilizing so called cold expansion, i.e. mechanical expansion of a pipe end section of a pipe made, for example, of cross-linked polyethylene. A tubular connecting part of a pipe fitting may then be inserted into the expanded pipe end. The memory properties of the pipe material make the initially expanded pipe end shrinkage back towards its original shape and dimensions, whereby it is pressed on the connecting part of the fitting. Thereby, a sealed connection is formed between the fitting and the pipe.

In many applications, the rapidity of the formation of a sufficiently secure sealing is an important factor affecting the effectiveness and productivity of the plumbing work. Shrinkage performance of the pipe materials typically depend on the ambient temperature: the formation of the sealed connection may become undesirably slow in cold conditions. In this sense, the design and way of operation of the tool used for expanding the pipe end, and the design of the connecting part of the pipe fitting, may be key factors for the feasibility of the cold expansion fittings especially in cold conditions.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In first aspect, a pipe fitting may be implemented for forming a cold expansion pipe connection, the pipe fitting comprising a tubular connecting part extending substantially in an axial direction $D_A$ and a shoulder extending radially outwards from one end of the connecting part; the tubular connecting part being configured to be inserted into a pipe end section of a pipe expanded by an expanding tool head comprising a plurality of radially movable outer spreading surfaces, the outer spreading surfaces comprising a first circumferential groove crossing each of the outer spreading surfaces and leaving, during expansion of a pipe end section, a first circumferential intact sealing region on the inner surface of the pipe end section at a first distance from the end of the pipe; whereby the tubular connecting part comprises a first radially outwards extending circumferential sealing barb positioned for engaging, when in use, with the circumferential intact sealing region during shrinkage of the pipe end section for forming a sealing between the pipe fitting and the pipe.

In an embodiment, the radially movable outer spreading surfaces comprises a second circumferential groove crossing each of the outer spreading surfaces and leaving, during expansion of a pipe end section, a second circumferential intact sealing region on the inner surface of the pipe end section at a second distance, larger than the first distance, from the end of the pipe; whereby the tubular connecting part comprises a second radially outwards extending circumferential sealing barb positioned for engaging, when in use, with the second circumferential intact sealing region during shrinkage of the pipe end section for forming a sealing between the pipe fitting and the pipe.

In an embodiment, one of the first and the second sealing barbs lies at the free end of the tubular connecting part lying opposite to the shoulder.

In an embodiment, at least one of the first and the second sealing barbs has a wedge-shape longitudinal section in the axial direction with a first facet with a first slope on the side of the free end of the tubular connecting part, and a second facet with a second slope steeper than the first slope on the side of the shoulder, the first and the second facets being connected via a tip.

In an embodiment, the tip has a radius of curvature less than or equal to 0.020 inches, for example, in the range of 0.005 to 0.020 inches.

In an embodiment, the first slope forms, or the first facet lies at, an angle of 10 to 30 degrees, for example, an angle of 20 to 25 degrees, with respect to the axial direction $D_A$ of the tubular connecting part.

In an embodiment, the second slope forms, or the second facet lies at, an angle of 55 to 90 degrees, for example, an angle of 75 to 90 degrees, with respect to the axial direction $D_A$ of the tubular connecting part.

In an embodiment, the radially movable outer spreading surfaces comprises an additional circumferential groove crossing each of the outer spreading surfaces and leaving, during expansion of a pipe end section, a circumferential intact retaining region on the inner surface of the pipe end section preferably between the end of the pipe and the first circumferential intact sealing region; whereby the tubular connecting part comprises a radially outwards extending circumferential retaining barb positioned for engaging, when in use, with the inner surface of the pipe end section behind the circumferential intact retaining region so as to prevent the pipe fitting from escaping out of the pipe during and/or after shrinkage of the pipe end section.

In an embodiment, the tubular connecting part has a chamfer enlarging the inner diameter of the tubular connecting part towards the free end thereof lying opposite to the shoulder.

In an embodiment, the tubular connecting part has a wall thickness which is substantially constant outside the sealing barb(s), possible retaining barb, and possible chamfer.

In an embodiment, the pipe fitting is configured for forming a cold expansion pipe connection with a pipe having a pipe inner diameter outside the pipe end section, wherein the tubular connecting part has a connecting part inner diameter outside the possible chamfer that is substantially equal to or larger than the pipe inner diameter.

In another aspect, a pipe connection, which may be a cold expansion pipe connection, may be implemented which comprises: a pipe fitting in accordance with any of those of the first aspect discussed above; and a pipe; the tubular connecting part of the pipe fitting being inserted into a pipe end section of the pipe having a first circumferential intact sealing region on the inner surface of the pipe end section; the first radially outwards extending circumferential sealing barb of the tubular connecting part being engaged with the first circumferential intact sealing region to form a sealing between the pipe fitting and the pipe.

In an embodiment, the pipe has a pipe inner diameter outside the pipe end section, and the tubular connecting part has a connecting part inner diameter outside the possible chamfer that is substantially equal to or larger than the pipe inner diameter.

In yet another aspect, a cold expansion pipe connection system may be implemented which comprises: a pipe fitting in accordance with any of those of the first aspect discussed above; and a pipe to be connected to the pipe fitting at a pipe end section thereof.

In one embodiment, the pipe has a pipe inner diameter outside the pipe end section, and the tubular connecting part has a connecting part inner diameter outside the possible chamfer that is substantially equal to or larger than the pipe inner diameter.

In yet another aspect, a cold expansion pipe connection equipment may be implemented which comprises: an expanding tool head for expanding a pipe end section of a pipe, the expanding tool head comprising a plurality of radially movable outer spreading surfaces, the outer spreading surfaces comprising a first circumferential groove crossing each of the outer spreading surfaces and leaving, during expansion of a pipe end section, a first circumferential intact sealing region on the inner surface of the pipe end section; and a pipe fitting in accordance with any of those of the first aspect discussed above.

In an embodiment, the expanding tool head is configured to expand a pipe end section of a pipe having a pipe inner diameter outside the pipe end section, and the tubular connecting part has a connecting part inner diameter outside the possible chamfer that is substantially equal to or larger than the pipe inner diameter.

In yet another aspect, a cold expansion pipe connection method may be implemented which comprises: expanding a pipe end section of a pipe by an expanding tool head comprising a plurality of radially movable outer spreading surfaces, the outer spreading surfaces comprising a first circumferential groove crossing each of the outer spreading surfaces and leaving, during expansion of a pipe end section, a first circumferential intact sealing region on the inner surface of the pipe end section; inserting a pipe fitting into the expanded pipe end section, the pipe fitting comprising a tubular connecting part and a shoulder extending radially outwards from one end of the connecting part, the tubular connecting part comprising a first radially outwards extending circumferential sealing barb positioned for engaging, when in use, with the circumferential intact sealing region during shrinkage of the pipe end section; and letting the expanded pipe end section shrink to form a sealing between the pipe fitting and the pipe.

In an embodiment, the pipe has a pipe inner diameter outside the pipe end section, and the tubular connecting part has, outside a possible chamfer on its inner surface enlarging the inner diameter of the tubular connecting part towards the free end thereof lying opposite to the shoulder, a connecting part inner diameter that is substantially equal to or larger than the pipe inner diameter.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

The drawings of FIGS. 1 to 4 are schematic and not necessarily to scale.

DETAILED DESCRIPTION

The detailed description provided below in connection with the appended drawings is intended as a description of a number of embodiments and is not intended to represent the only forms in which the embodiments may be constructed, implemented, or utilized.

Figure 1:
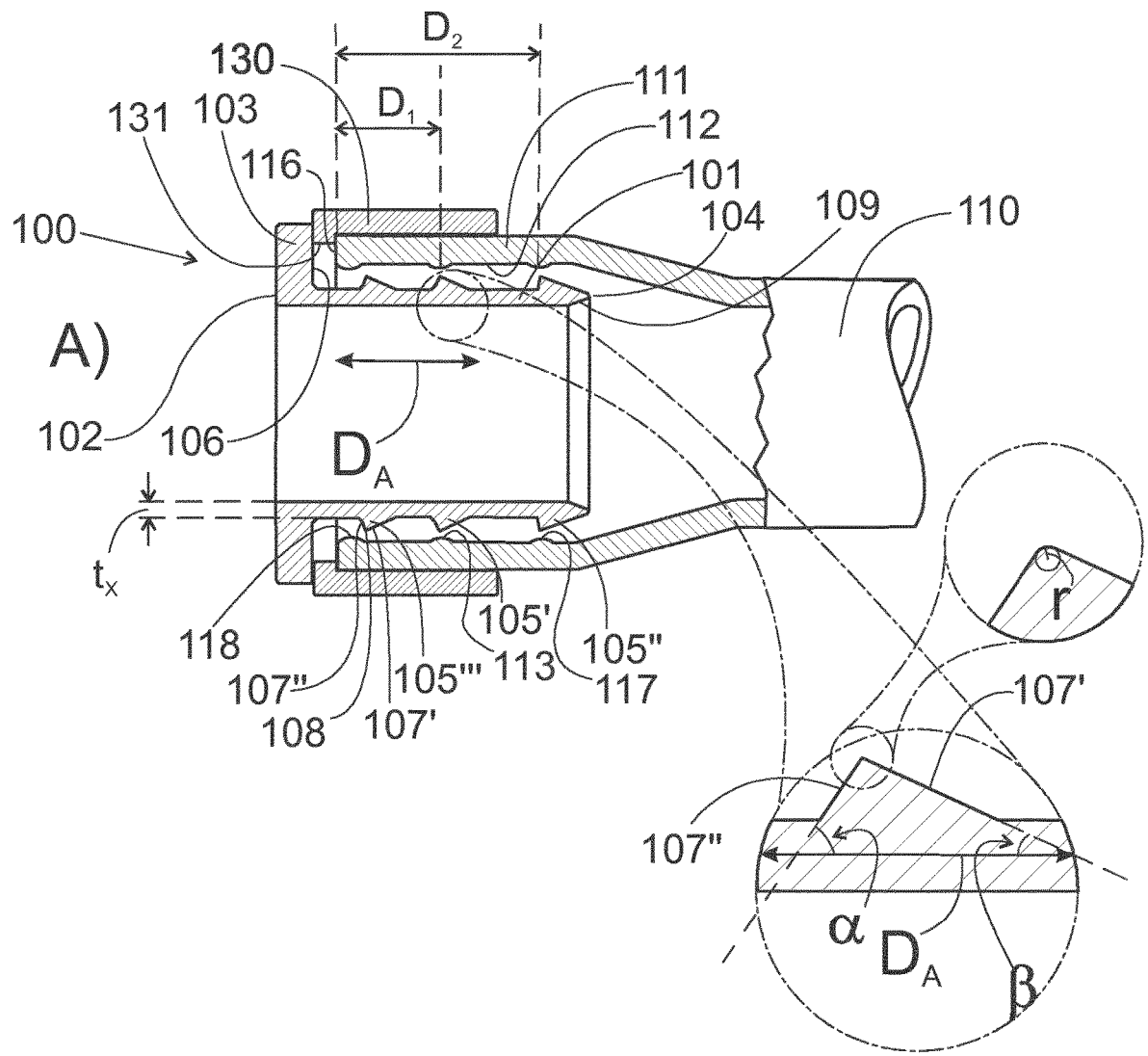
FIG. 1 illustrates, as partial longitudinal sectional views, parts and formation of a cold expansion pipe connection.
Figure 1:
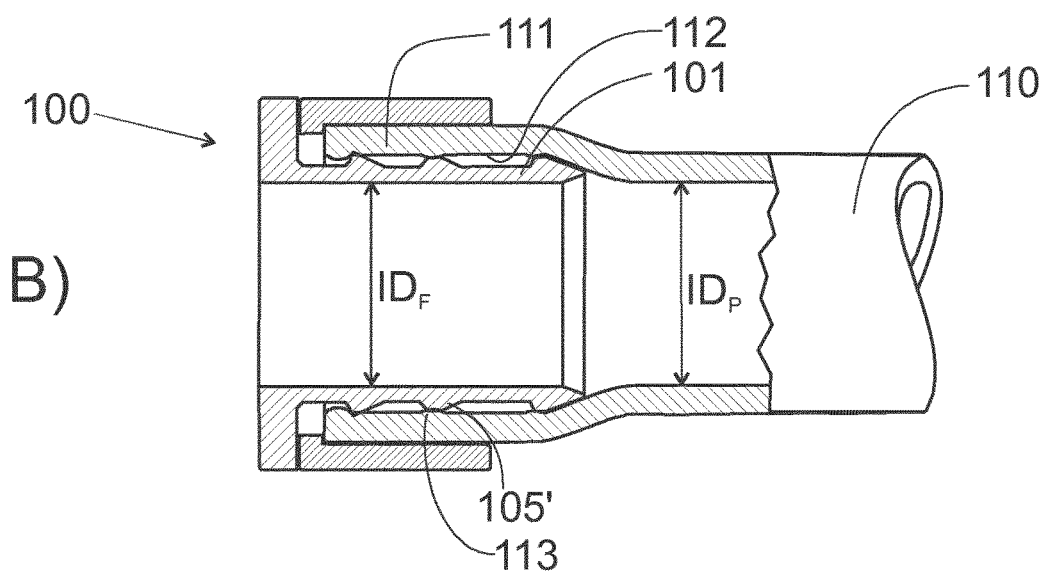

The pipe fitting 100 of FIG. 1 may be used to form a cold expansion pipe connection. "Expansion" refers basically to the pipe connecting techniques which are based on mechanically expanding a pipe end section, followed by letting the expanded pipe end section shrinkage towards its original dimensions after a pipe fitting having been inserted into the expanded pipe end section. In "cold expansion" techniques, such expanding can be carried out purely mechanically, without heating the pipe end section. Also the shrinkage may take place without any activation by heat, thus automatically on the basis of the so called memory properties of the pipe material. Thus, a cold expansion pipe connection may be formed completely without applying external heat to the pipe end section to be heated.

A "pipe" refers basically to any tubing, thus a tubular structure with an internal flow channel for a fluid such as water. The flow channel may have substantially circular cross section.

A "pipe end section" refers to a section of a pipe extending from an end of the pipe to a predetermined distance therefrom. A pipe end section may be the section to be expanded when forming a cold expansion pipe connection.

A pipe to be used in forming a cold expansion pipe connection may be formed of any material, such as cross linked polyethylene PEX and its different variants, having appropriate memory properties for providing sufficient compressive force on the pipe fitting to ensure secure sealing. A reinforcing or clamping ring, also formed of a material such as cross-linked polyethylene having sufficient memory properties, may be used as positioned over the pipe end section during the expansion and shrinkage thereof. Such ring may further strengthen and secure the pipe connection.

The pipe fitting of FIG. 1 comprises a tubular connecting part 101. The connecting part has a first end 102 at which a shoulder 103 extends outwards from the connecting part, and a second or free end 104 lying opposite to the shoulder.

The connecting part 101 extends substantially in an axial direction $D_A$. The axial direction refers to the longitudinal direction of the connecting part, i.e. the direction in which the tubular connecting part has a length. Basically, said direction may also refer to the direction of a central axis of a tubular connecting part. The shoulder 103 extending "outwards" extends in a radial direction, i.e. perpendicularly to said axial direction $D_A$.

The pipe fitting 100 of FIG. 1 is configured to be used in connection with a pipe end section which has been expanded by a specific type of expanding tool head. Such expanding tool head may be in accordance with that illustrated in FIG. 4, and also basically in accordance with the expanding tool head illustrated in FIG. 2.

Drawing A of FIG. 1 shows the pipe fitting 100 with its tubular connecting part 101 inserted into such expanded pipe end section 111 of a pipe 110. Drawing B illustrates the situation after the initially expanded pipe end section has shrunk so that it is pressed against the tubular connecting part. The situation of drawing B of FIG. 1 showing the pipe end section shrunk so as to be pressed against the tubular connecting part may be considered as an illustration of a cold expansion pipe connection. It is possible that after the situation illustrated in drawing B, the pipe end section is still shrunk further. Then, it may become more conformal with the outer surface of the tubular connecting part.

An "expanding tool head" refers to a mechanical assembly which may be used as a releasable part of, or be integrated in, an expanding tool to expand pipe end sections. The expanding tool head then serves as the member of the tool assembly which actually contacts the pipe end section inner surface during the expanding operation.

Figure 2:
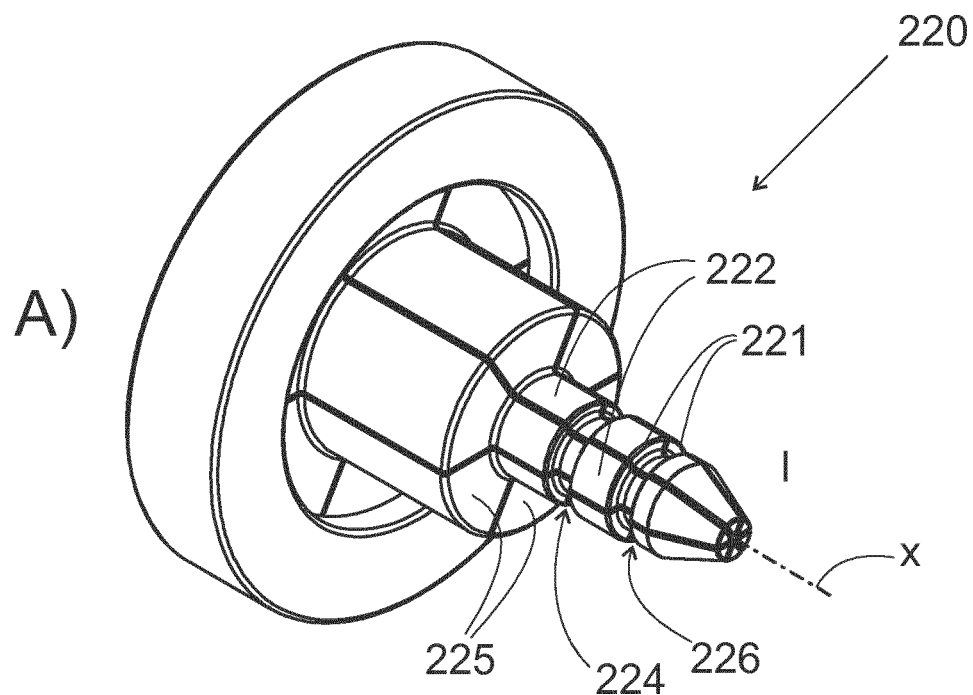
FIG. 2 illustrates, as perspective views, structure and operation of an expanding tool head.
Figure 2:
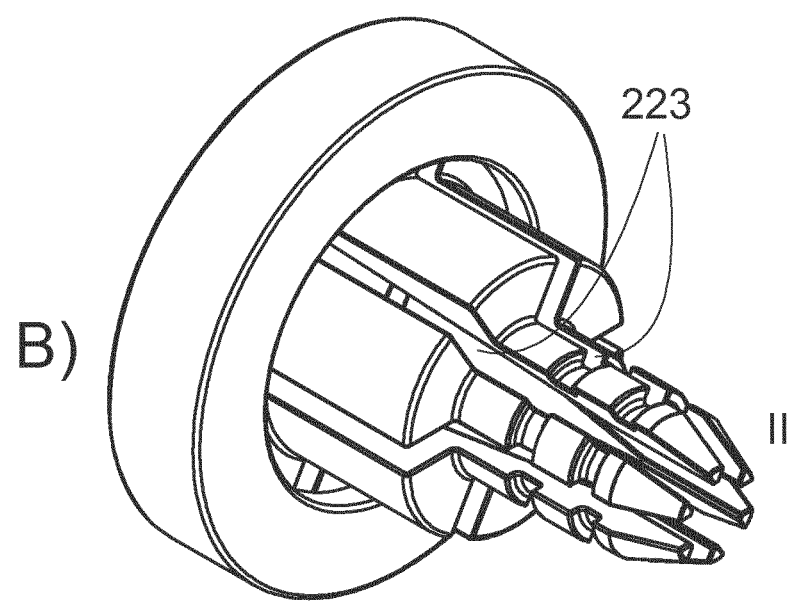

The expanding tool head 220 of FIG. 2 comprises a plurality of spreading elements 221 which are radially movable in relation to a center longitudinal axis x of the tool head.

The spreading elements 221 have a starting position I illustrated in drawing A of FIG. 2, at which position the spreading elements lie close to said axis x and adjacent to each other. With the spreading elements in this starting position, the expanding tool head may be inserted into a pipe end section to be expanded.

The spreading elements 221 have also an outwardly extended expansion position II illustrated in drawing B of FIG. 2, at which position the spreading elements are radially distanced from said axis x to expand the pipe end section.

The expanding tool head may be actuated, i.e. the spreading elements may be transferred between the starting position and the expansion position by any appropriate means. For example, the spreading elements may have beveled inner surfaces, and the expander tool may have a piston with a tapered end configured to engage with and slide along those beveled surfaces. Then, the radial movement of the spreading elements may be effected by axial movement of the piston.

Each of the spreading elements has an outer spreading surface 222. In the example of FIG. 2, each outer spreading surface is an nth part of a substantially cylindrical surface, wherein n is the number of the spreading elements 221. When in use, during expansion of a pipe end section, the outer spreading surfaces may be pressed against the inner surface of the pipe end section.

As can be seen in FIG. 2, with the spreading elements 221 in their outwardly extended expansion position, the outer spreading surfaces are separated from each other by lateral gaps 223.

Due to said lateral gaps, the expansion of the pipe end section is effected by pressing the inner surface of the expanded pipe end section at discrete regions along the circumference of the inner surface only. Therefore, the expanded pipe end section may have an alternating inner radius or diameter. This is illustrated in FIG. 3 as the cross section A of the pipe end section 111.

The outer spreading surfaces 222 comprise a first circumferential groove 224 which extends circumferentially so that it crosses each outer spreading surface in the circumferential direction. During expansion, there is no contact between the expanding tool head 220 and the inner surface 112 of the pipe end section at the location of the first circumferential groove. Therefore, this groove leaves a first circumferential intact, non-contacted and therefore undamaged sealing region 113 on the inner surface of the pipe end section. At the location of this sealing region, the expanded pipe end section may advantageously have a constant inner radius or diameter. This is illustrated in FIG. 3 as the cross section B.

Figure 3:
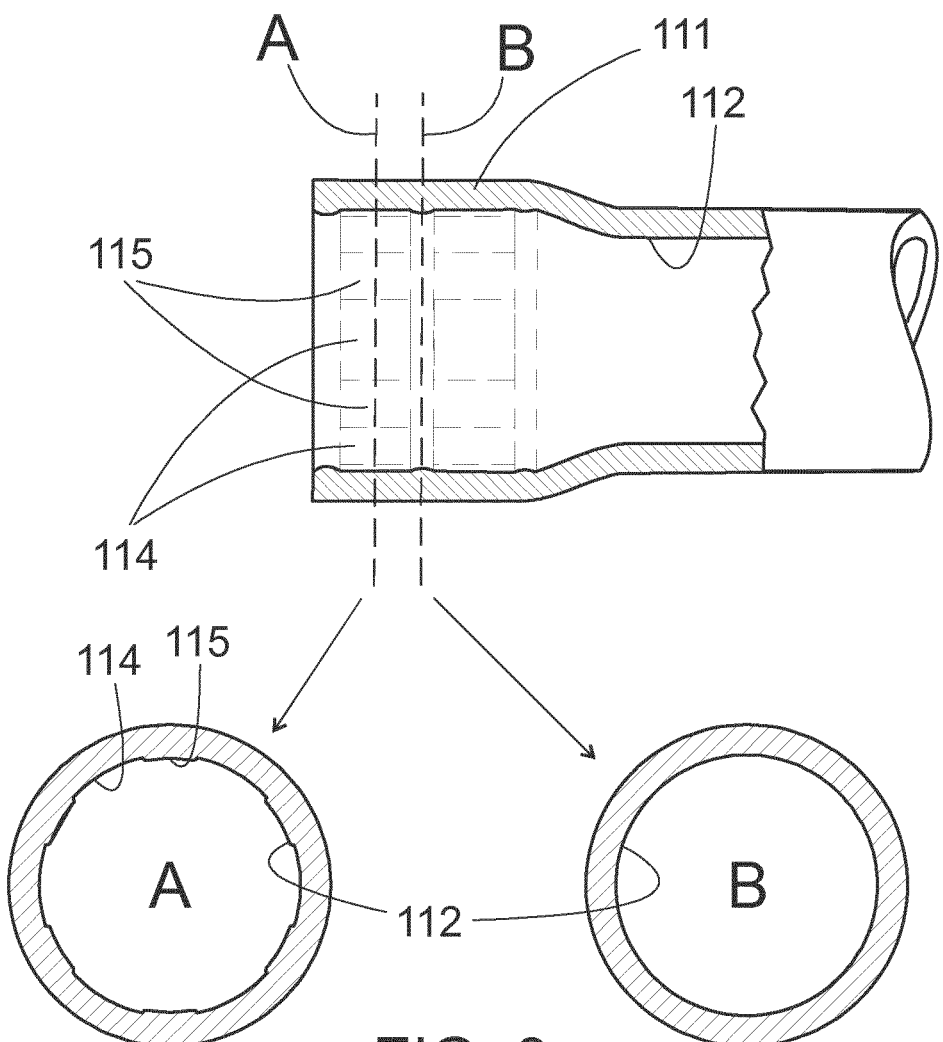
FIG. 3 illustrates, as a partial longitudinal sectional view and as two cross sectional views, the pipe of FIG. 1.

FIG. 3 thus shows two cross sections of the expanded pipe end section 111. Cross section A represents the situation at the location in the axial direction of the pipe outside any circumferential groove. Cross section B represents the situation at the location of the first circumferential groove of the expanding tool head.

In the cross-section A of FIG. 3, the inner radius or diameter of the connecting part changes along the circumference of the connecting part. Those regions 114 of the inner surface 112 of the pipe end section where the outer spreading surfaces pressed the inner surface of the pipe end section have been forced farther from the center longitudinal axis (x) than the regions 115 of the inner surface 112 of the pipe end section formed at the locations of the lateral gaps 223 between the adjacent outer spreading surfaces 221 of the expanding tool head.

Such non-uniform radius or diameter, meaning a non-circular circumference of the inner surface, make different regions of the inner surface circumference engage with the connecting part 101 of the pipe fitting 100 at different times during the shrinkage of the pipe end section 111. Those non-contacted regions 115 resulted from the lateral gaps reach the outer surface of the connecting part 101 first. After this engaging, the shrinkage may slow down, and it may therefore take a long time before the inner surface 112 of the pipe end section 111 is pressed on the connecting part throughout its circumference.

In the cross-section B, instead, the inner radius or diameter of the connecting part is substantially constant and the first circumferential sealing region is thus substantially circular.

In addition to the outer spreading surface, each spreading element 221 of the expanding tool head 220 of FIG. 2 has further a radial stop face 225.

The first circumferential groove 224 is located so that when using the expanding tool 220 at its intended way of use, the first circumferential intact sealing region 113 is formed at a first distance $D_1$ from the end 116 of the pipe. Said intended way of use may comprise, for example, positioning the end 116 of the pipe or, possible end of a clamping or reinforcing ring positioned on the pipe end section and extending beyond the end of the pipe, against the radial stop faces 225 of the spreading elements 221 of the expanding tool head. In the example of FIG. 1, such extension beyond the end 116 of the pipe 110 is defined by the thickness of the stop edge 131 of the clamping or reinforcing ring 130. Thus, the first circumferential groove 224 may lie at the first distance, or at a distance of the first distance $D_1$ plus the possible extension of an end of a clamping ring beyond the end of the pipe, from the radial stop faces 225 of the spreading elements 221 of the expanding tool head.

In the example of FIG. 2, a stop face 225 of is formed in each of the spreading elements. In other embodiments, a stop face may be arranged in an expanding tool head separately from the radially movable spreading surfaces.

Referring back to FIG. 1, the connecting part 101 of the pipe fitting 100 comprises a first radially outwards extending circumferential sealing barb 105'.

A "barb" refers to a rib or ridge structure. A sealing barb has, for ensuring reliable sealing, preferably substantially constant height in the radial direction.

The first radially outwards extending circumferential sealing barb 105' is advantageously positioned so that when using the expanding tool at its intended way of use, this first sealing barb engages with the first circumferential intact sealing region 113 during shrinkage of the pipe end section 111. Said intended way of use may comprise, for example, inserting the connecting part 101 into the pipe end section 111 so far that the end 116 of the pipe or, end of a possible clamping or reinforcing ring positioned on the pipe end section and extending beyond the end of the pipe, is set against the radial stop face 106 of the shoulder 103 of the pipe fitting 100. Thus the first radially outwards extending circumferential sealing barb 105' may lie at the first distance $D_1$, or at a distance of the first distance plus the possible extension of an end of a clamping ring beyond the end of the pipe, from the radial stop face 106 of the shoulder 103 of the pipe fitting 100.

Due to the substantially circular first circumferential intact sealing region 113, the sealing barb 105' may contact the pipe inner surface 112 substantially at the same time throughout the circumference thereof. This may enable a rapid formation of a sealed connection already before the pipe end section 111 have been shrunk so as to make the entire inner surface 112 thereof being pressed against the connecting part of the pipe fitting. This may facilitate forming cold expansion connections, in particular, in low assembling temperatures.

In the example of FIG. 2, there is also a second circumferential groove 226 extending circumferentially so as crossing each of the outer spreading surfaces 222 and leaving, during expansion of a pipe end section 111, a second circumferential intact sealing region 117 on the inner surface 112 of the pipe end section. The second circumferential groove is located so that when using the expanding tool at its intended way of use, the second circumferential intact sealing region is formed at a second distance $D_2$ from the end of the pipe. Thus, the second circumferential groove may lie at the second distance, or at a distance of the first distance plus the possible extension of an end of a clamping ring beyond the end 116 of the pipe 110, from the radial stop faces 225 of the spreading surfaces 221 the expanding tool head 220.

The second distance $D_2$ is larger than the first distance. So, the second circumferential groove lies farther from the stop faces of the spreading surfaces 221 than the first circumferential groove.

Referring again back to FIG. 1, the connecting part 101 of the fitting comprises also a second radially outwards extending circumferential sealing barb 105". This second sealing barb is advantageously positioned so that when using the expanding tool at its intended way of use, this sealing barb engages with the second circumferential intact sealing region 117 during shrinkage of the pipe end section 111. Thus, the second radially outwards extending circumferential sealing barb may lie at the second distance $D_2$, or at a distance of the second distance plus the possible extension of an end of a clamping ring beyond the end 116 of the pipe, from the radial stop face 106 of the shoulder 103 of the pipe fitting 100.

The second radially outwards extending circumferential sealing barb 105" may operate similarly to the first radially outwards extending circumferential sealing barb 105'. Thereby, it may further secure rapid formation of a sealed pipe connection.

In the example of FIG. 1, the second sealing barb 105" lies at the free end 104 of the tubular connecting part 101. This positioning may advantageously serve as a guiding member facilitating insertion of the connecting part of the pipe fitting into an expanded pipe end section. Further, it may serve as a stabilizer to reduce side to side rocking or motion during the shrinkage of the pipe end section.

In other embodiments, a second radially outwards extending circumferential sealing barb may lie elsewhere, between a first radially outwards extending circumferential sealing barb and the free end of the tubular connecting part.

In the example of FIG. 1, each of the sealing barbs 105', 105" has, in a longitudinal section plane along the center longitudinal axis of the pipe fitting, a wedge-shape cross section. The wedge shape has a first facet 107' with a first slope on the side of the free end 104 of the tubular connecting part. A second facet 107" with a second slope which is steeper than the first slope lies on the side of the shoulder 103 of the pipe fitting. Said basic configuration of the barbs may allow inserting of the connecting part properly into the pipe end section.

The facets are connected via a tip 108 at the top of the wedge shape. Preferably, the tip is substantially or nearly sharp. It may have, for example, a radius of curvature r of less than or equal to 0.020 inches, for example, in the range of 0.005 to 0.020 inches. Appropriate sharpness, i.e. suitable radius of curvature, of the tip may facilitate formation of a sealed connection between the sealing barb and the sealing region of the inner surface of the pipe end section. Thereby, a rapid formation of a sealed pipe connection may be achieved.

In the example of FIG. 1, to ensure proper performance of the fitting, the first facet lies at an angle α of about 25 degrees, and the second slope lies at an angle β of about 55 degrees, with respect to the axial direction $D_A$. Said angles are defined as the smaller angles formed between the slopes of the facets and the axial direction. In other embodiments, the first facet may lie at an angle of 10 to 30 degrees, for example, an angle of 20 to 25 degrees, and/or the second facet may lie at an angle of 55 to 90 degrees, for example, an angle of 75 to 90 degrees, with respect to the axial direction $D_A$ of the tubular connecting part.

Figure 4:
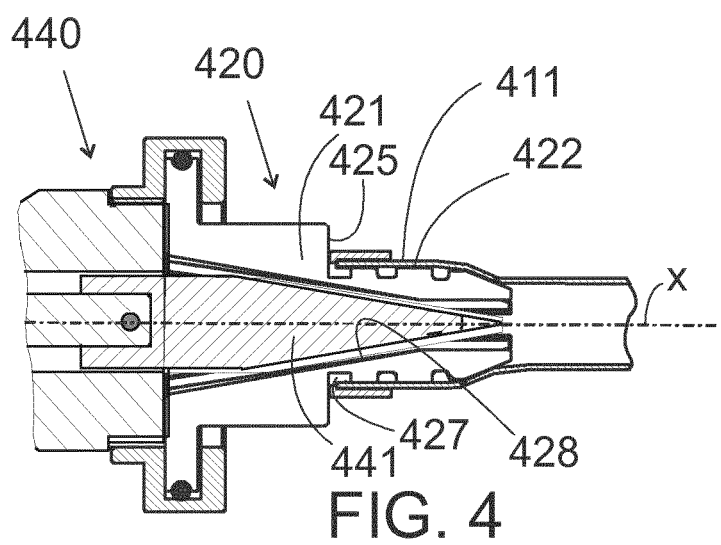
FIG. 4 illustrates, as a longitudinal cross sectional view, structure and operation on an expanding tool head.

The expanding tool head 420 of FIG. 4 differs from that of FIG. 2 in that the radially movable outer spreading surfaces 422 of the expanding tool head 420 comprise further an additional circumferential groove 427 which crosses each of the outer spreading surfaces. This additional groove lies substantially at the end of the outer spreading surfaces 422 where the stop faces 425 of the spreading elements 421 lie. This additional groove leaves, during expansion of a pipe end section, a circumferential intact retaining region 118 on the inner surface 112 of the pipe end section 111 substantially at the end of the pipe as illustrated in FIG. 1. In other embodiments, an additional groove may be positioned to leave such retaining region at some other location, preferably between the end of the pipe and the first circumferential intact sealing region.

In the example of FIG. 4, the expanding tool head 420 of FIG. 4 is connected to an expander tool 440. The expander tool comprises a radially movable piston 441. The piston has a tapered end configured to engage with beveled inner surfaces 428 of the spreading elements 421 to control radial movement thereof by axial movement of the piston.

Referring again back to FIG. 1, the connecting part 101 of the pipe fitting 100 comprises correspondingly a radially outwards extending circumferential retaining barb 105'''. This retaining barb is advantageously positioned so that when using the expanding tool head at its intended way of use, this retaining barb engages, during shrinkage of the pipe end section, the inner surface 112 of the pipe end section 111 behind the circumferential intact retaining region 118. In the example of FIG. 1, said positioning is achieved by having the tip of the cross section of the retaining ring lying at a distance from the stop face of the shoulder which is equal to the thickness of the stop edge of the clamping ring plus the width of the circumferential intact retaining region. In other embodiments, corresponding positioning of a retaining barb behind a circumferential intact retaining region may be achieved differently, depending on the position and width of the retaining region and the presence of a clamping ring on the pipe end section extending beyond the end of the pipe.

The retaining barb 105''' positioned behind the circumferential intact retaining region 118 may retain the connecting part 101 within the pipe end section, thus prevent the pipe fitting from escaping out of the pipe end section, during and/or after the shrinkage of the pipe end section. Thereby, it may facilitate ensuring that the sealing barbs are positioned as properly aligned with the intact sealing regions of the inner surface of the pipe end section.

In the example of FIG. 1, the retaining barb 105''' has the same wedge-shaped cross section as the sealing barbs. In other embodiments, retaining barbs may be used with any appropriate longitudinal sectional shape suitable for providing said retaining function.

In the example of FIG. 1, there is a chamfer 109 on the inner surface of the tubular connecting part at the free end of the connecting part. The chamfer enlarges the inner diameter of the tubular connecting part towards the free end thereof lying opposite to the shoulder. The chamfer may advantageously reduce disturbances to the flow of a fluid between the pipe and the pipe fitting connected to it. In other embodiments, pipe fittings may be implemented without any chamfer.

Differently from the example of FIG. 1, other embodiments may be implemented with different number and/or of sealing and/or retaining barbs in the connecting part of a pipe fitting. For example, there may be only one, thus "first" sealing barb. Alternatively, connecting parts may have more than two retaining barbs. Preferably, at least one sealing barb lies in a middle section of the tubular connecting part between the ends thereof. Also the number of retaining barbs may vary; connecting pieces may be implemented without any retaining barb, or with two or more retaining barbs. In such other embodiments, one or more of the possibly several sealing barbs may be in accordance with any of the tip and facet/slope configurations discussed above.

Such pipe fittings differing form that of FIG. 1 may be configured to be inserted into pipe end sections expanded by expanding tool heads having a circumferential groove configuration correspondingly differing from that of FIG. 1.

In the example of FIG. 1, outside the first and the second sealing barb and the retaining barb and the chamfer, the wall thickness of $t_X$ the tubular connecting part is substantially constant. Also in other embodiments, irrespective of the number and positioning of various sealing and/or retaining barbs, the wall thickness may be substantially constant outside the sealing barb(s), possible retaining barb (s), and possible chamfer.

Said substantially constant wall thickness may enable maximizing the volume of the flow channel formed within the tubular connecting part, as discussed further below.

Pipe fittings may be provided for different pipe sizes so that there is a specific pipe fitting size with specific outer diameter of the connecting part for each pipe inner diameter. Thereby, cold expansion pipe connection systems may be implemented for different pipe sizes, each such system comprising a pipe fitting and a pipe to be connected to the pipe fitting at a pipe end section thereof. An example of such system is illustrated in FIG. 1.

On the other hand, expanding tool heads may be provided for different pipe sizes so that there is a specific expanding tool head size with specific outer diameter of cylinder formed by the outer spreading surfaces for each pipe inner diameter. Thereby, cold expansion pipe connection equipment may be implemented for each pipe sizes, each such system comprising an expanding tool head as discussed above with reference to FIG. 2 or FIG. 3, and a pipe fitting.

In the example of FIG. 1, the tubular connecting part is configured so that the connecting part inner diameter $ID_F$ outside possible chamfer is substantially equal to the pipe inner diameter $ID_F$. In other embodiments, it may be even slightly larger. Equal or larger inner diameter may advantageously contribute to reducing disturbances to the flow of a fluid between the pipe and the pipe fitting connected to it.

Pipe inner diameter refers to the inner diameter of the pipe outside the pipe end section thereof.

Pipe fittings and/or expanding tool heads may be provided, for example, for pipe inner diameters in the range of 10 to 50 mm or 0.5 to 2 inches.

Any of the pipe fittings discussed above may also be used in connection with an expanded pipe end section expanded by using an expanding tool head different from those discussed above with reference to FIGS. 2 and 4. This is the case especially as far as after the expansion, the expanded pipe end section comprises on its inner surface a first possibly intact circumferential sealing region and possibly also a second possibly intact circumferential sealing region and/or a possibly intact circumferential retaining region corresponding to the first sealing barb and possible second sealing barb and/or retaining barb of the pipe end section, respectively.

Figure 5:
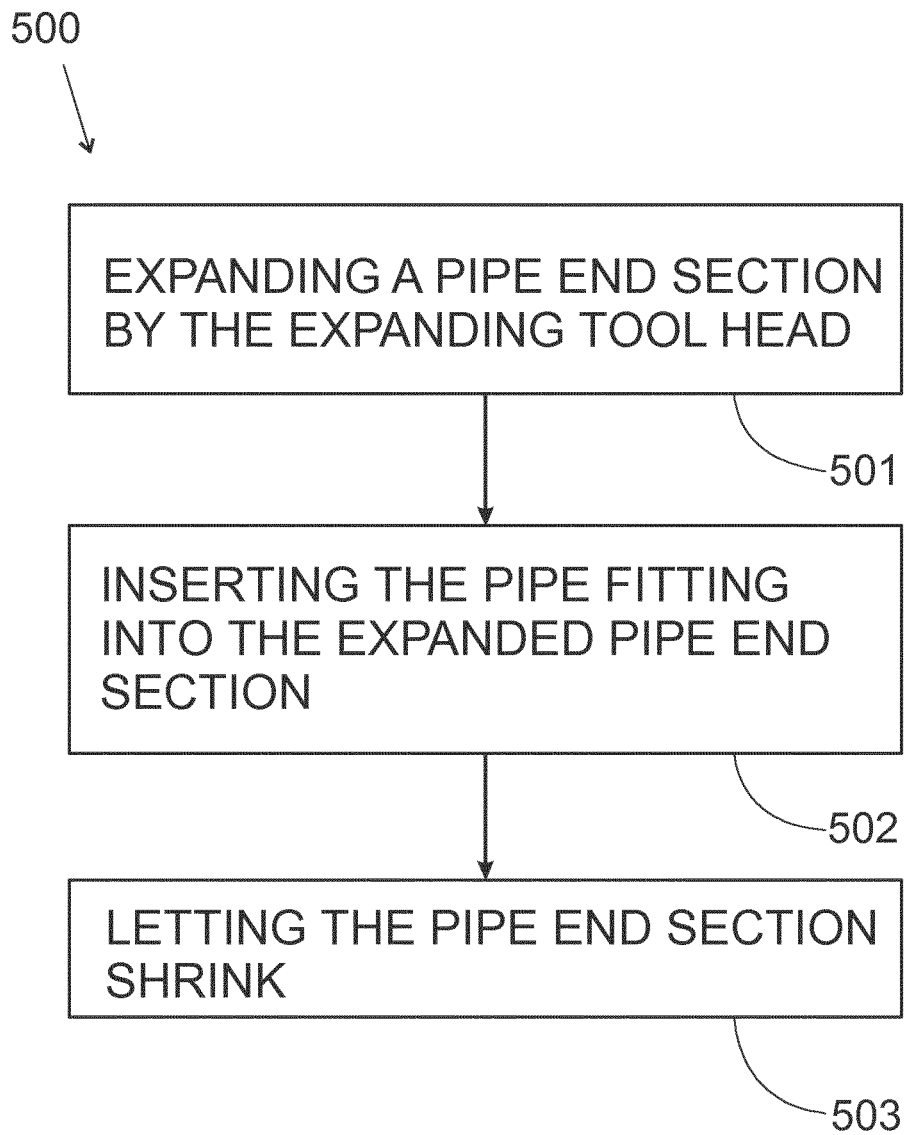
FIG. 5 illustrates a flow chart of a method for forming a cold expansion pipe connection.

In the method 500 of FIG. 5, any of the expanding tool heads and corresponding pipe fittings and pipes discussed above may be used.

In the method, a pipe end section of a pipe, possibly together with a clamping or retaining ring positioned over the pipe end section, is expanded by an expanding tool head in step 501. Then, the tubular connecting part of a pipe fitting is inserted into the expanded pipe end section in step 502. The expanded pipe end section is then let shrink in step 503 so that it is pressed against the tubular connecting part of the pipe fitting, whereby a sealed pipe connection is formed between the pipe fitting and the pipe.

Steps 501 and 502 may be carried out at least partially simultaneously so that the shrinkage of the pipe end section may already have been initiated when the connecting part of the pipe fitting is inserted into the initially expanded pipe section.

Preferably, the tubular connecting part of the pipe fitting used in the method has, outside a possible chamfer on its inner surface, a connecting part inner diameter that is substantially equal to or larger than the pipe inner diameter outside the pipe end section.

It is to be noted that the present invention is not limited to the embodiments and examples above. Instead, the embodiments of the present invention can freely vary within the scope of the claims.

It will be understood that the benefits and advantages described above may relate to one embodiment or example or may relate to several embodiments or examples. The embodiments and examples are not limited to those that solve any or all of the stated problems or those that have any or all of the stated benefits and advantages. It will further be understood that reference to 'an' item refers to one or more of those items.

The term "comprising" is used in this specification to mean including the feature(s) followed thereafter, without excluding the presence of one or more additional features. The term "plurality" is used in this specification to mean the same as "more than one", i.e. the same as "at least two".

The invention claimed is:

1. A pipe fitting for forming a cold expansion pipe connection, comprising:
   a tubular connecting part extending substantially in an axial direction and a shoulder extending radially outwards from one end of the tubular connecting part;
   the tubular connecting part being configured to be inserted into a pipe end section of a pipe expanded by an expanding tool head comprising a plurality of radially movable outer spreading surfaces, the outer spreading surfaces comprising a first circumferential groove crossing each of the outer spreading surfaces and leaving, during expansion of the pipe end section, a first circumferential intact sealing region on an inner surface of the pipe end section at a first distance from an end of the pipe; the tubular connecting part comprising a first radially outwards extending circumferential sealing barb positioned for engaging, when in use, with the first circumferential intact sealing region during shrinkage of the pipe end section for forming a sealing between the pipe fitting and the pipe; wherein the sealing barb has a wedge-shape longitudinal section in the axial direction with a first facet with a first slope on a side of a free end of the tubular connecting part, and a second facet with a second slope steeper than the first slope on a side of the shoulder, the first and the second facets being connected via a tip, wherein the tip has a radius of curvature r in the range of 0.005 to 0.020 inches, and wherein the first slope lies at an angle of 20 to 25 degrees with respect to the axial direction of the tubular connecting part and extends to the tip connecting the first and the second facets.

2. A pipe fitting as defined in claim 1, the radially movable outer spreading surfaces comprising a second circumferential groove crossing each of the outer spreading surfaces and leaving, during expansion of a pipe end section, a second circumferential intact sealing region on the inner surface of the pipe end section at a second distance from the end of the pipe, the second distance being larger than the first distance; the tubular connecting part further comprising a second radially outwards extending circumferential sealing barb positioned for engaging, when in use, with the second circumferential intact sealing region during shrinkage of the pipe end section for forming a sealing between the pipe fitting and the pipe.

3. A pipe fitting as defined in claim 2, wherein the second sealing barb forms the free end of the tubular connecting part lying opposite to the shoulder.

4. A pipe fitting as defined in claim 1, wherein the second facet lies at an angle of 55 to 90 degrees with respect to the axial direction of the tubular connecting part.

5. A pipe fitting as defined in claim 1, the radially movable outer spreading surfaces of the expanding tool head comprising an additional circumferential groove crossing each of the outer spreading surfaces and leaving, during expansion of a pipe end section, a circumferential intact retaining region on the inner surface of the pipe end section between the end of the pipe and the first circumferential intact sealing region; the tubular connecting part comprising a radially outwards extending circumferential retaining barb positioned for engaging, when in use, with the inner surface of the pipe end section behind the circumferential intact retaining region so as to prevent the pipe fitting from escaping out of the pipe during and/or after shrinkage of the pipe end section.

6. A pipe fitting as defined in claim 1, wherein the tubular connecting part has a chamfer enlarging an inner diameter of the tubular connecting part towards the free end thereof lying opposite to the shoulder.

7. A pipe fitting as defined in claim 1, wherein the tubular connecting part has a wall thickness which is substantially constant outside the sealing barb.

8. A pipe fitting as defined in claim 1, configured for forming a cold expansion pipe connection with a pipe having a pipe inner diameter outside the pipe end section, wherein the tubular connecting part has a connecting part inner diameter that is substantially equal to or larger than the pipe inner diameter.

9. A pipe connection comprising:
   a pipe fitting as defined in claim 1 and
   a pipe;
   the tubular connecting part being inserted into a pipe end section of the pipe having a first circumferential intact sealing region on the inner surface of the pipe end section; the first radially outwards extending circumferential sealing barb of the tubular connecting part being engaged with the first circumferential intact sealing region to form a sealing between the pipe fitting and the pipe.

10. A pipe connection as defined in claim 9, the pipe having a pipe inner diameter outside the pipe end section, wherein the tubular connecting part has a connecting part inner diameter that is substantially equal to or larger than the pipe inner diameter.

11. A cold expansion pipe connection system comprising:
    a pipe fitting as defined in claim 1; and
    a pipe to be connected to the pipe fitting at a pipe end section thereof.

12. A pipe connection system as defined in claim 11, the pipe having a pipe inner diameter outside the pipe end section, wherein the tubular connecting part has a connecting part inner diameter that is substantially equal to or larger than the pipe inner diameter.

13. A cold expansion pipe connection equipment comprising:
    an expanding tool head for expanding a pipe end section of a pipe, the expanding tool head comprising a plurality of radially movable outer spreading surfaces, the outer spreading surfaces comprising a first circumferential groove crossing each of the outer spreading surfaces and leaving, during expansion of a pipe end section, a first circumferential intact sealing region on the inner surface of the pipe end section at a first distance from the end of the pipe; and
    a pipe fitting as defined in claim 1.

14. A pipe connection equipment as defined in claim 13, the expanding tool head being configured to expand a pipe end section of a pipe having a pipe inner diameter outside the pipe end section, wherein the tubular connecting part has a connecting part inner diameter outside the possible chamfer that is substantially equal to or larger than the pipe inner diameter.

* * * * *